(12) United States Patent
Hemkumar et al.

(10) Patent No.: US 6,356,871 B1
(45) Date of Patent: Mar. 12, 2002

(54) METHODS AND CIRCUITS FOR SYNCHRONIZING STREAMING DATA AND SYSTEMS USING THE SAME

(75) Inventors: Nariankadu Datatreya Hemkumar; Miroslav Dokic; Raghunath Krishna Rao, all of Austin, TX (US)

(73) Assignee: Cirrus Logic, Inc.

( * ) Notice: Subject to any disclaimer, the term of this patent is extended or adjusted under 35 U.S.C. 154(b) by 0 days.

(21) Appl. No.: 09/332,804

(22) Filed: Jun. 14, 1999

(51) Int. Cl.[7] .............................................. G10L 19/00
(52) U.S. Cl. ...................................... 704/500; 375/355
(58) Field of Search ................................. 375/372, 354, 375/355; 704/500, 502

(56) References Cited

U.S. PATENT DOCUMENTS

| | | | |
|---|---|---|---|
| 4,453,259 A | * 6/1984 | Miller | 375/355 |
| 4,623,915 A | * 11/1986 | Bolger | 348/566 |
| 4,802,119 A | 1/1989 | Heene et al. | |
| 4,991,217 A | 2/1991 | Garrett et al. | |
| 5,193,204 A | 3/1993 | Qureshi et al. | |
| 5,206,884 A | 4/1993 | Bhaskar | |
| 5,235,671 A | 8/1993 | Mazor | |
| 5,436,900 A | 7/1995 | Hammar et al. | |
| 5,491,771 A | 2/1996 | Gupta et al. | |
| 5,497,373 A | 3/1996 | Hulen et al. | |
| 5,553,063 A | 9/1996 | Dickson | |
| 5,652,903 A | 7/1997 | Weng et al. | |
| 5,699,392 A | 12/1997 | Dokic | |
| 5,703,877 A | * 12/1997 | Nuber et al. | 370/395 |
| 5,726,989 A | 3/1998 | Dokic | |
| 5,761,516 A | 6/1998 | Rostoker et al. | |
| 5,768,613 A | 6/1998 | Asghar | |
| 5,835,375 A | 11/1998 | Kitamura | |
| 5,905,768 A | * 5/1999 | Maturi et al. | 375/364 |
| 5,936,968 A | * 8/1999 | Lyons | 370/503 |
| 6,166,673 A | * 12/2000 | Odom | 341/155 |
| 6,181,706 B1 | * 1/2001 | Anderson et al. | 370/412 |

FOREIGN PATENT DOCUMENTS

| | | |
|---|---|---|
| EP | 0 514 949 A2 | 11/1992 |
| EP | 0 682 337 A1 | 11/1995 |
| EP | 0 734 021 A2 | 9/1996 |

* cited by examiner

Primary Examiner—William Korzuch
Assistant Examiner—Daniel Abebe
(74) Attorney, Agent, or Firm—James J. Murphy; Winstead Sechrest & Minick

(57) ABSTRACT

A method for synchronizing stream processing with a locally generated system time clock is disclosed. A program clock reference is recovered from a transport layer and used to vary the frequency of the locally generated system time clock. A presentation time stamp is recovered from a packetized elementary stream derived from the transport layer. The relationship between a reference sample associated with the presentation time stamp from the packetized elementary stream and a current sample being streamed is determined relative to the system time clock. Data samples are added or subtracted from a stream of data samples being streamed in response to the step of determining to establish a relationship between the stream of samples and the presentation time stamp relative to the system time clock.

26 Claims, 4 Drawing Sheets

METHODS AND CIRCUITS FOR SYNCHRONIZING STREAMING DATA AND SYSTEMS USING THE SAME

CROSS-REFERENCE TO RELATED APPLICATION

The following co-pending and co-assigned application contains related information and is hereby incorporated by reference: Ser. No. 08/970,979, entitled "DIGITAL AUDIO DECODING CIRCUITRY, METHODS AND SYSTEMS", filed Nov. 14, 1997.

BACKGROUND OF THE INVENTION

1. Field of the Invention

The present invention relates in general to data processing and in particular, to methods and circuits for synchronizing streaming data and systems using the same.

2. Description of the Related Art

Under the United States high definition television (HDTV) standard (as promulgated by the Advanced Television Systems Committee), audio, video and associated control and user information are transmitted in a transport stream, for example, that defined under the MPEG2 standard. Within the stream, the video and audio data are themselves compressed into blocks, for example the video may be compressed under one of the MPEG (Motion Pictures Expert Group) formats and the audio under the Dolby AC3® (Dolby® Digital) standard. Other forms of encoding/compression may also be used, for example MPEG audio, AAC audio or MLP audio.

At the transport stream level, a Program Clock Reference (PCR) is periodically inserted in the packet stream. The PCR is a time stamp indicating the then current time with reference to a System Time Clock (STC) base against which the data was encoded into the transport stream. The PCR is used to synchronize corresponding system time clocks in the video and audio decoders.

At the decoder, disposed for example in a television unit or set-top box, the data is demultiplexed and reassembled as a packetized elementary stream (PES). In the PES layer, the audio and video data are packed into blocks along with the corresponding headers required under the specific audio and video compression standards used. The video and audio streams are then switched to the appropriate decoder.

A Presentation Time Stamp (PTS) is periodically inserted in the blocks of compressed audio and video data. The PTS indicates to the respective audio or video decoder when the following block or blocks of data are to be played to the audience. The PTS is also referenced to the STC.

Compression of audio and data is central to both the feasibility and economy of transmission of the information necessary for program dissemination in such applications as digital television and similar systems. Typically, however, decompressing compressed data is a relatively time consuming task. Moreover, decode times are not predictable and can vary significantly between the audio and video processing paths as a result of the use of diverse compression algorithms. Hence, successful use of presentation time stamps is crucial. Additionally, error concealment techniques rely on the time stamps, and therefore to insure that audio and/or video data is not lost, the time stamps and synchronized playback must be effectively used. This aids in mitigating artifacts in the presentation to the end user.

It is incumbent therefore that audio and video systems ensure fidelity playback with respect to a locally regenerated time information using the timestamps recovered from the audio and video subsystems. In sum, therefore, methods of synchronizing a data decoder with a corresponding source of encoded data are required.

SUMMARY OF THE INVENTION

A method is disclosed for synchronizing stream processing with a locally generated system time clock. A program clock reference (PCR) is recovered from a transport layer and used in varying the frequency of the locally generated system time clock. A presentation time stamp (PTS) is recovered from a packetized elementary stream (PES) derived from the transport layer. The relationship between a reference sample associated with the presentation time stamp and a current sample being streamed is determined relative to the system time clock. Samples are then added or subtracted from a stream of data samples being output to establish a relationship between the presentation time stamps and the stream of samples relative to the system time clock.

The present inventive principles allow for the efficient detection of instances where a processing device is running ahead of or behind where it should be according to a presentation time stamp. In this respect, the present inventive principles advantageously provide for the determination of both a time advantage and a sample advantage between the current data being output and a reference sample associated with the time stamp. Among other things, these principles can be applied to the synchronization of streaming audio and video data under various transport schemes and compression standards.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIG. 1–6 of the drawings, in which like numbers designate like parts.

Figure 1A:
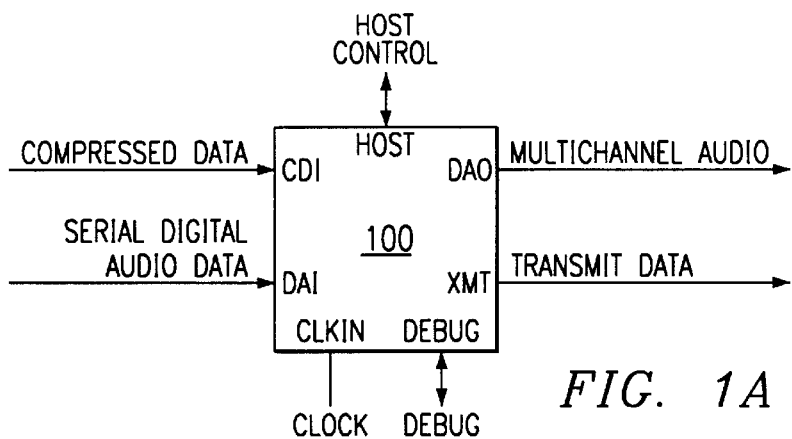
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data in conforming to the AC-3 digital audio compression standard, (as defined by the United States Advanced Television System Committee) through a compressed data input port CDI. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bitstreams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each of 512 time samples, are multiplied by a time window and transformed into the frequency domain. Because the blocks of time samples overlap, each PCM input sample is represented by two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encoding each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC-3 bit stream also includes a number of additional information. For instance, each frame may include a frame header which indicates the bit rate, sample rate, number of encoded samples, and similar information necessary to subsequently synchronize and decode the AC-3 bit stream. Error detection codes may also inserted such that the device such as decoder 100 can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the advanced televisions systems committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. Among other things, a bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
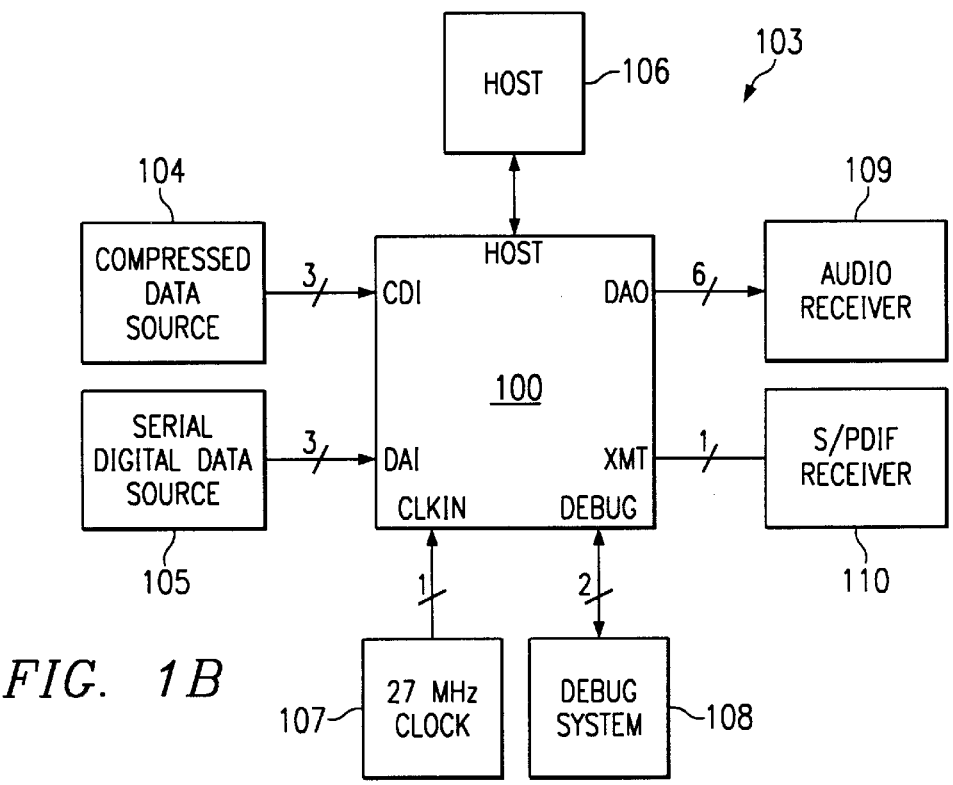
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio source 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to an S/PDIF receiver 110. These outputs may be coupled, for example, to digital to analog converters or codecs for transmission to analog receiver circuitry.

Figure 1C:
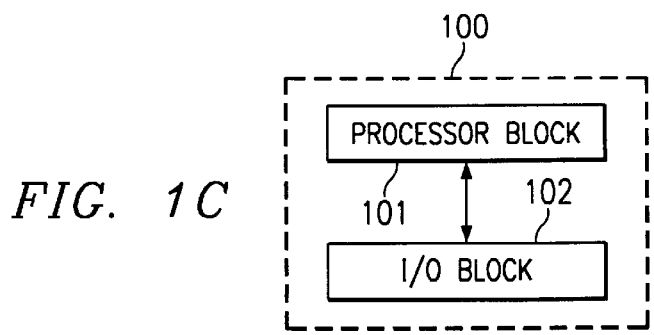
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and the I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPS.

Figure 2:
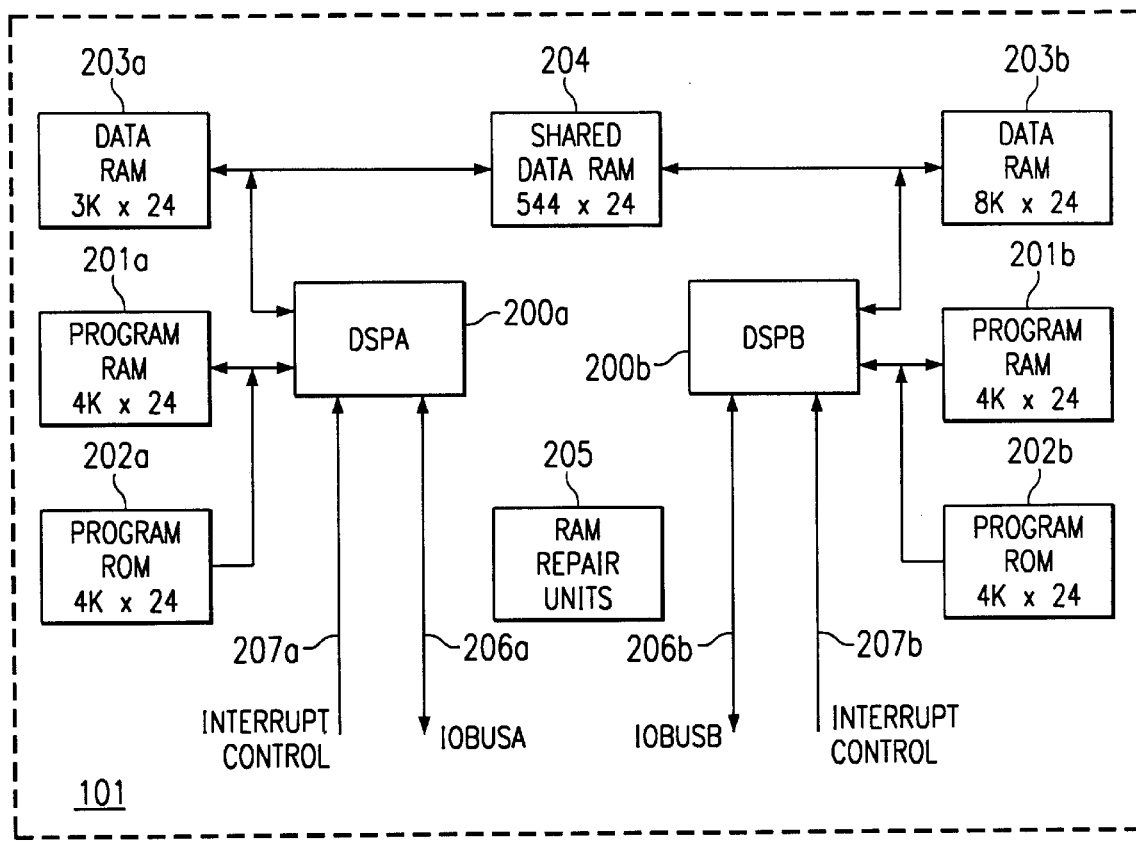
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b. Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b.

Figure 3:
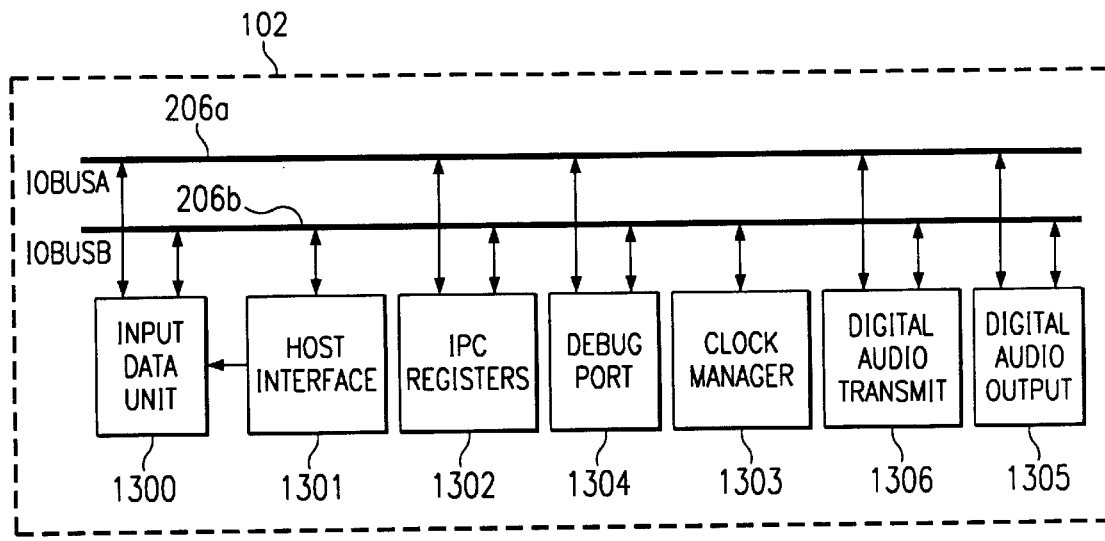
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 1200 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200a) or DSPB (200b). Any read or write conflicts are resolved by treating DSPB as the master and ignoring DSPA.

The principles of the present invention further allow for methods of decoding compressed audio data, as well as for methods and software for operating decoder 100. These principles will be discussed in further detail below. Initially, a brief discussion of the theory of operation of decoder 100 will be undertaken.

The Host can choose between serial and parallel boot modes during the reset sequence. The Host interface mode and autoboot mode status bits, available to DSPB 200b in the HOSTCTL register MODE field, control the boot mode selection. Since the host or an external host ROM always communicates through DSPB. DSPA 200a and 200b receives code from DSPB 200b in the same fashion, regardless of the host mode selected.

In a dual-processor environment like decoder 100, it is important to partition the software application optimally between the two processors 200a, 200b to maximize processor usage and minimize inter-processor communication. For this the dependencies and scheduling of the tasks of each processor must be analyzed. The algorithm must be partitioned such that one processor does not unduly wait for the other and later be forced to catch up with pending tasks. For example, in most audio decompression tasks including Dolby AC-3®, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3® requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of similar complexity, there will be no waiting on either DSP side.

Figure 4:
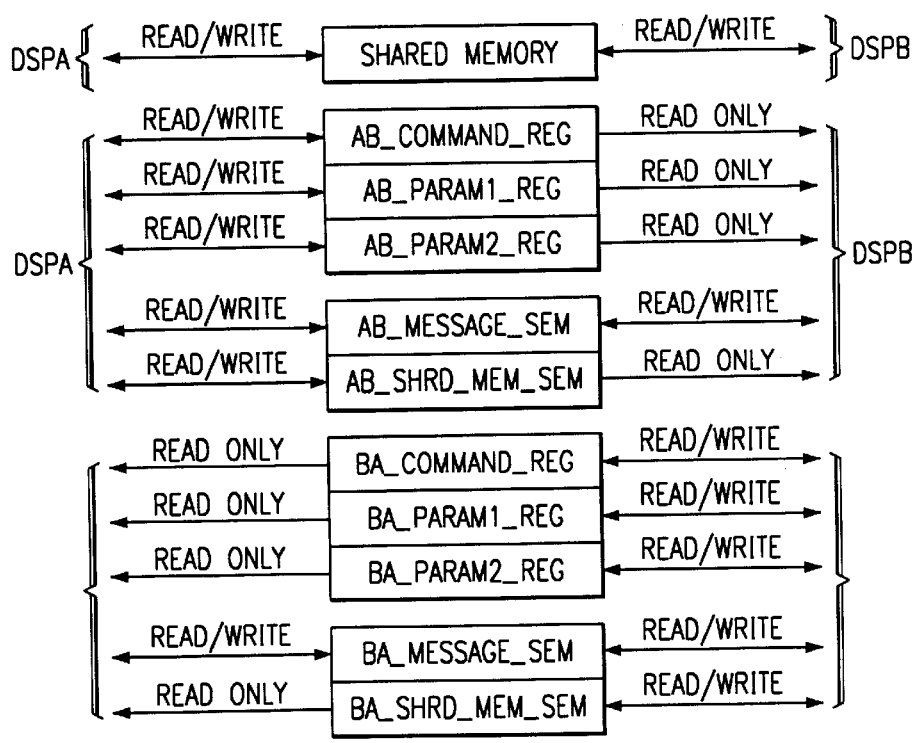
FIG. 4 is a diagram of the interprocessor communications (IPC) registers as shown in FIG. 3

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this
(a) AB_command_register (DSPA write/read, DSPB read only)
(b) AB_parameter1_register (DSPA write/read, DSPB read only)
(c) AB_parameter2_register (DSPA write/read, DSPB read only)
(d) AB_message_semaphores (DSPA write/read, DSPB write/read as well)
(e) AB_shared_memory_semaphores (DSPA write/read, DSP B read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200*a*, 200*b* can write to or read from shared memory 204. However, software management provides that the two DSPs never write to or read from shared memory in the same clock cycle. It is possible, however, that one DSP writes and the other reads from as shared memory at the same time, given a two-phase clock in the DSP core. This way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_semaphore register which can be written by both DSPs. Full symmetry in communication is provided even though for most applications the data flow is from DSPA to DSP B. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. The DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory_semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending message that it took the data from shared memory and DSPA is setting shared memory flags to zero in its interrupt handler. This way full synchronization is achieved and no access violations performed.

When designing a real time embedded system both hardware and software designers are faced with several important trade-off decisions. For a given application a careful balance must be obtained between memory utilization and the usage of available processing bandwidth. For most applications there exist a very strong relationship between the two: memory can be saved by using more MIPS or MIPS could be saved by using more memory. Obviously, the trade-off exists within certain boundaries, where a minimum amount of memory is mandatory and a minimum amount of processing bandwidth is mandatory.

An example of such trade-off in the AC-3 decompression process is decoding of the exponents for the sub-band transform coefficients. The exponents must arrive in the first block of an AC-3 frame and may or may not arrive for the subsequent blocks, depending on the reuse flags. But also, within the block itself, 6 channels are multiplexed and the exponents arrive in the bitstream compressed (block coded) for all six channels, before any mantissas of any channel are received. The decompression of exponents has to happen for the bit allocation process as well as scaling of mantissas. However, once decompressed, the exponents might be reused for subsequent blocks. Obviously, in this case they would be kept in a separate array (256 elements for 6 channels amounts to 1536 memory locations). On the other hand, if the exponents are kept in compressed form (it takes only 512 memory locations) recomputation would be required for the subsequent block even if the reuse flag is set. In decoder 100 the second approach has been adopted for two reasons: memory savings (in this case exactly 1 k words) and the fact that in the worst case scenario it is necessary to recompute the exponents anyway.

The proper input FIFO is important not only for the correct operation of the DSP chip itself, but it can simplify the overall system in which decoder 100 reside. For example, in a set-top box, where AC-3 audio is multiplexed in the MPEG2 transport stream, the minimum buffering requirement (per the MPEG spec) is 4 kbytes. Given the 8 kbyte input FIFO in decoder 100 (divisible arbitrarily in two, with minimum resolution of 512 bytes), any audio bursts from the correctly multiplexed MPEG2 transport stream can be accepted, meaning that no extra buffering is required upstream in the associated demux chip. In other words, demux will simply pass any audio data directly to the codec 100, regardless of the transport bit rate, thereby reducing overall system cost.

Also, a significant amount of MIPS can be saved in the output FIFOs, which act as a DMA engine, feeding data to the external DACs. In case there are no output FIFOs the DSP has to be interrupted at the F. rate (sampling frequency rate). Every interrupt has some amount of overhead associated with switching the context, setting up the pointers, etc. In the case of the codec 100, a 32 sample output is provided FIFO with half-empty interrupt signal to the DSP, meaning that the DSP is now interrupted at Fs/16 rate. Subsequently, any interrupt overhead is reduced by a factor of 16 as well, which can result in 2–3 MIPS of savings.

In the dual DSP architecture of decoder 100 the amount of shared memory is critical. Since this memory is essentially dual ported resulting in much larger memory cells and occupying much more die area, it is very critical to size it properly. Since decoder 100 has two input data ports, and the input FIFO is divisible to receive data simultaneously from the two ports, the shared memory was also designed to handle two data channels. Since the size of one channel of one block of AC-3 data is 256 transform coefficients a 256 element array has been allocated. That is, 256 PCM samples can be transferred at the same time while transferring AC-3 transform coefficients. However, to keep two DSP cores 200a and 200b in sync and in the same context, an additional 32 memory locations are provided to send a context descriptor with each channel from DSPA to DSPB. This results in the total shared memory size of 544 elements, which is sufficient not only for AC-3 decompression implementation but also for MPEG 5.1 channel decompression as well as DTS audio decompression.

The PCM buffer size is another critical element since all 6 channels are decompressed. Given the AC-3 encoding scheme (overlap and add), theoretically a minimum of 512 PCM data buffer is required. However, given a finite decoder latency, another buffer of 256 samples for each channel is required so that ping-pong strategy can be employed. While one set of 256 samples is being processed, another set of 256 is being decoded. A decode process must be completed before all samples in PCM buffer are played, but given a MIPS budget this is always true. So, no underflow conditions should occur.

Interprocessor Communication (IPC) and Protocol can now be described in further detail in view of the discussion above and FIG. 4. The Dual DSP processor architecture according to the principles of the present invention, is advantageously very powerful in the effective use of available MIPS. However, it is important to remember that the target application must be such that it is relatively easy to split processing between the two engines. Both AC-3 and MPEG-2 multichannel surround applications possess this quality. The essential element to an efficient implementation of these applications is the effective communication between the two engines. In decoder 100 the shared resources between the two processors are the 544×24 word data memory 204 and the communication register file 1302 consisting of ten I/O registers.

These shared resources can advantageously synchronize the 2 DSPs for the task at hand.

1. Shared Data Memory

The basic concept behind the shared memory is that of master and Slave. DSPB is defined as the master in the system, and is also the master of the write access to the shared memory. In the case of a read access DSPA is the master of the shared memory 1302. Both processors are allowed to write and read to and from the shared memory.

The concept of the Access Token is introduced here. Most of the discussion that follows concentrates on write token, however, the same concept applies to read token as well. It is possible that one processor has the ownership of write token and the other has the ownership of the read token. It is also possible that one processor has the ownership of both tokens.

The AB_semaphore_token register (FIG. 4) has the following format:

TABLE 1

| AB_semaphore_token register | | | |
|---|---|---|---|
| RD_PRIVILEGE_B | WR_USE_A | PCM_DATA_READY | TC_READY |

Note that DSPA can both write and read into this register and that DSPB can only read from this register.

The BA_semaphore_token register has the following format:

TABLE 2

| BA_semaphore_token register | | | |
|---|---|---|---|
| WR_PRIVILEGE_A | RD_USE_B | BA_DATA1_READY | BA_DATA2_READY |

Note that DSPB can both write and read into this register and that DSPA can only read from this register A. Communication Register File The communication register file (FIG. 4) consists of eight registers. They are split into two groups of four registers each, as shown below.

```
COMMAND_AB [23:0]
PARAMETER_0_AB [23:0]
PARAMETER_1_AB [23:0]
COMMAND_AB_PENDING [0]
AB_semaphore_token
register
COMMAND_BA [23:0]
PARAMETER_0_BA [23:0]
PARAMETER_1_BA [23:0]
COMMAND_BA_PENDING [0]
BA_semaphore_token
register
```

The first group of four registers is used by DSPA to send commands to DSPB, along with appropriate parameters. The second set of registers is used by DSPB to send commands and parameters to DSPA. So, the communication protocol is completely symmetrical.

Consider the case when DSPA is sending a command to DSPB. Before DSPA can send a command, it must check the COMMAND_AB_PENDING flag to make sure that the previous command from A to B was taken by DSPB. If it is appropriate to send the message, DSPA assembles the parameters, sets the COMMAND_AB_PENDING flag and writes the command itself. Otherwise, DSPA waits at Step 5303. The event of writing the COMMAND_AB_PENDING triggers a DSPB interrupt, which in turn reads the command and its parameters and at the end clears the COMMAND_AB_PENDING flag. (DSPB may also poll the command pending to determine if a message is waiting, rather than receiving an active interrupt from DSPA.) This allows DSPA to then send another command if necessary.

It should be noted that both DSPs have write access to the COMMAND PENDING register but the software discipline will ensure that there is never a conflict in the access. If DSP(A/B) 200a, 200b cannot issue the command because the COMMAND_AB_PENDING bit is set, it will either wait or put a message into a transmit queue. Once the command is received on the other side, the receiving DSP can either process the command (if it is a high-priority command) or store it into a receive queue and process the command later. Scheduling of command execution will be such that minimum latency is imposed in the system. Regular checking at the channel resolution (about 1 ms) will ensure minimal latency in processing commands.

When one processor is not accepting messages, a time-out is required to inform the Host about the potential problem. If DSPA is not responding to messages from DSPB, the Host will be notified by DSPB. If DSPB is not responding to DSPA, then, most likely, it is not responding to the Host either, and Host will know that explicitly. If DSPB is not responding to DSPA, but it is responding to the Host, DSPA will stall, will stop requesting data, the output buffers will underflow and the demux (or upstream delivery engine) will overflow in pushed systems or time-out in pulled systems.

As discussed above, during the decoding of audio data by decoder 100, an important task is maintaining synchronization between the time stamps embedded during the encoding process and the time base on which decoder 100 is operating. ("Synchronization" assumes an equalization in the time base frequencies has been achieved, and the "time" at the receiver in an absolute sense is sufficiently close to the transmitter's.) When synchronization is lost, the decoder will not output the decoded data at the proper time which ultimately results in the absence of appropriate sound at the appropriate instance in the speaker output. The principles of the present invention provide methods for determining whether decoder 100 is operating behind or ahead of the PTSs in the received stream. These methods can be implemented either in software of hardware. High level software routines then can determine if correction must be made by dropping or replicating selected blocks of data.

Figure 5A:
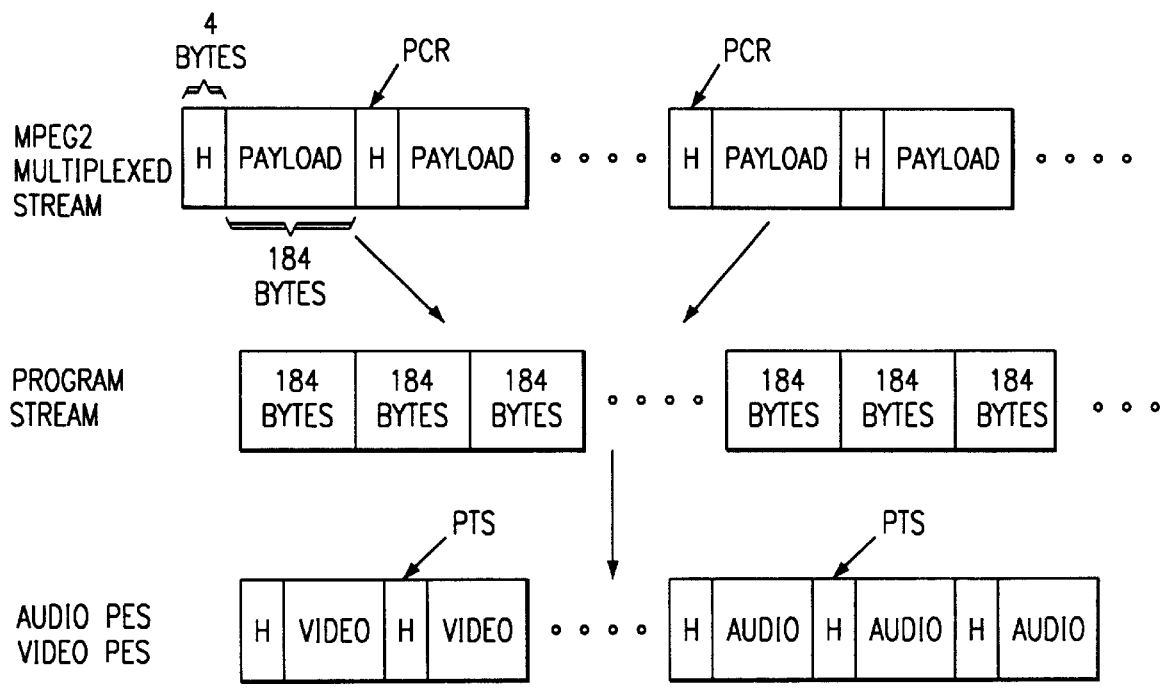
FIG. 5A is a diagram describing the processing of an exemplary MPEG transport stream carrying Packetized Elementary Streams (PES) of MPEG encoded video and AC3 encoded audio.
Figure 5B:
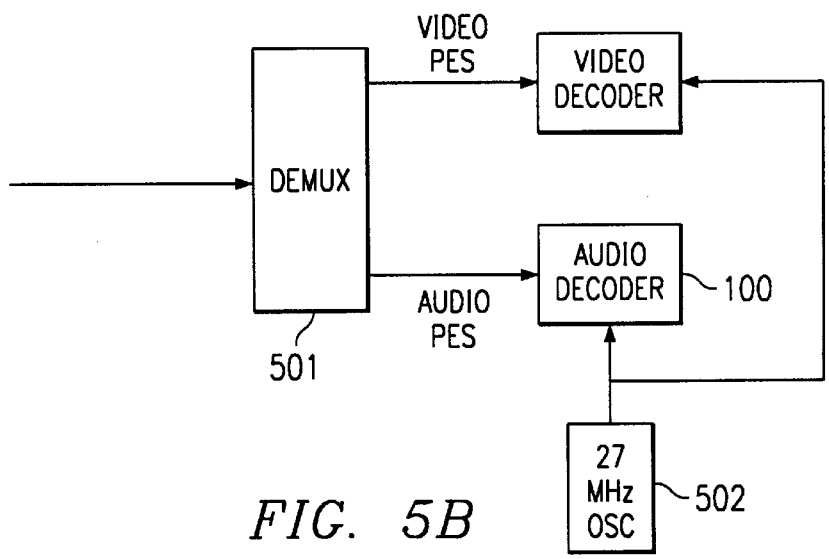
FIG. 5B is a diagram of the high level blocks of a system processing the streams shown in FIG. 5A.

FIGS. 5A and 5B depict the processing of an exemplary MPEG Packetized Elementary Stream (PES)carrying MPEG encoded video and AC3 encoded audio. The standard MPEG-2 PES or "transport stream" includes 188 byte packets carrying PCR time stamps and a 184-byte payload (Adaption Field). From the transport stream, data is assembled into 184-byte blocks of an intermediate program stream, and then into audio and video PES by demultiplexing software 501. The audio and video at this point is sent on the respective decoder.

A program clock reference (PCR) is periodically inserted into headers of selected packets in the transport stream. The PCR values are time stamps relative to the system time clock (STC) which clocked the encoding of the data. The frequency of the PCR values is a function of the desired rate of update (resynchronization) of the decoder STC.

Figure 6:
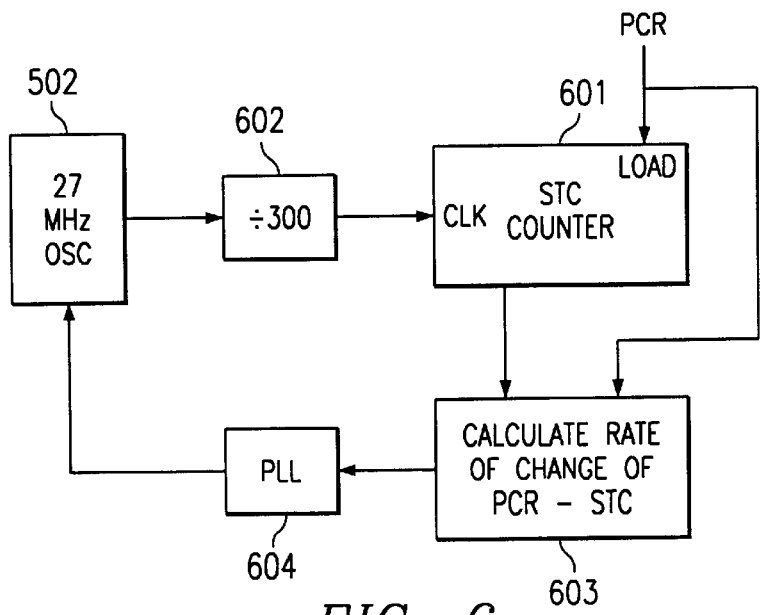
FIG. 6 is a diagram of the system time clock counter of the decoder depicted in FIG. 1.

In decoder 100, an initial PCR value is used to load an STC counter 601, depicted in FIG. 6, which increments with an STC clock generated on the decoder end of the system. The STC clock has a frequency of 90 kHz and is preferably derived from 27 MHz oscillator 502 by dividing by 300 at block 602. Decoder provides other sources for generating the STC in addition.

The current value in counter 602 is then subtracted at block 602 from each PCR value that is received. From the resulting difference, the time rate of change of the decoder STC values with respect to the received PCR values is calculated at block 603. If the time rate of change of the decoder STC values is the same as that of the received PCR values (i.e. the subtraction results in zeros), then the decoder STC frequency equals the frequency of the encoding STC clock and synchronization is being maintained. On the other hand, if the two rates of change differ (i.e. the difference between the two values continues to drift), then the encoding STC frequency does not equal the frequency of the encoding STC clock and the decoder is in an out of synchronization condition.

In the case when synchronization is lost, the decoder STC frequency is adjusted to achieve synchronization. For example, an error signal can be generated and a phase-locked-loop 604 used to vary the frequency of the 27 MHz oscillator used to generate the decoder STC clock. This adjustment process takes a finite amount of time, yet decoder must still continue to process data to support the output data stream.

As discussed above, the demultiplexer hardware and software assembles a Program Stream of 184-byte blocks from the PES payloads. Then, a stream of encoded video and audio data is derived along with the corresponding headers. For example, the video may be MPEG-1 or MPEG-2 encoded and the audio AC3 encoded. The presentation time stamps (PTS) which indicate the time at which the frames of audio or video data should be presented to the audience in terms of 90 kHz STC time units, are periodically inserted into the headers of selected audio and video data blocks. The audio PTS reference is the first sample in the accompanying PCM payload, as reconstructed from compressed data through the decoding process.

In the event of an out of synch condition, decoder 100 end up processing data before or after the time indicated by the corresponding PTS. When decoder 100 processes data after the time indicated by the PTS stamp has passed, one or more frames or samples must be skipped to adjust the presentation of audio to the audience to conform to the time stamp. When decoder 100 is running ahead of the data stream, a buffer underflow condition arises and no data is available to process. Here, the audio decoder waits for data to be played-back until the appropriate time while in the meantime, silence is output.

Decoder 100 determines whether frames or samples must be dropped or added during out of synch conditions by determining the sample advantage and/or time advantage between the data being processed and the corresponding PTS value. The sample advantage is the number of samples of audio ahead or behind the sample indicated by the current PTS which should be output at that time. Specifically, the sample advantage is the number of samples of audio the currently played-back sample is ahead or behind with respect to the reference sample. The time advantage is similar, except the difference is expressed in terms of STC time units.

In decoder 100, the pulse code modulated (PCM) data resulting from the decompression of AC3 data, is stored in a buffer within data memory associated with DSPB. A dipstick indicates the number of PCM samples remaining in this buffer. PCM samples from the memory buffer are transferred to a 32-word deep data output FIFO (DAO) any time the DAO FIFO reaches the half-empty state. Data is output from the FIFO at the sampling frequency $F_s$. Each time a transfer is made to the output FIFO or data enter the buffer, the dipstick value changes. Thus, the delay, in number of samples, that a given sample, including the reference sample, sees between its input into the PCM buffer and its output from the DAO FIFO is equal to the time required to output dipstick number of samples plus the number of samples in the output FIFO.

With this in mind, the sample advantage (SA) and time advantage (TA) can be computed:

TA=PTS−STC__lhe−{(DIPSTICK+FIFO__SIZE)* (STCFreq/Fs)}

SA={(PTS−STC__lhe) * (Fs/STCFreq)}−(DIPSTICK +FIFO__SIZE)

where:

STCFreq=the frequency of the STC in kHz (nominally 90 kHz);

PTS=the current PTS value in periods of the STC;

STC__lhe=the STC value in periods of the STC at the last half-empty interrupt to load output FIFO; DIPSTICK= the number of samples remaining in the memory buffer;

$F_s$=the sampling frequency in kHZ at which data samples are retrieved from the output FIFO; and FIFO__SIZE=number of samples in output FIFO.

In other words, to calculate the time advantage in periods of the STC, the difference between the time at which the reference word of a block of audio data should be output and the time when that word will actually be clocked through the memory buffer and the output FIFO with respect to the is determined in the following manner.

The quantity (PTS−STC__lhe) is the difference in STC periods between the time the reference sample should be presented and the time at which the last interrupt was taken to fill a half-empty output FIFO. The output FIFO can be assumed as full. The number of samples in front of the reference sample at this point is the number of samples ahead of the reference sample in the buffer (DIPSTICK) plus the 32 samples in the output FIFO or (DIPSTICK+32).

Multiplying this quantity by the ratio between the STC frequency and the sampling frequency, (STCFreq/$F_s$) results in the delay through the buffer and FIFO in number of STC time units per sample. This result is subtracted from (PTS−STC__lhe) to reach the final time advantage value.

A similar process is used to calculate the sample advantage (SA). In this case, the difference between the PTS and the STC time at the last half-empty FIFO interrupt is multiplied by the ratio between the sampling frequency and the STC frequency. The result is number of samples per STC time unit between the PTS and the reload of the FIFO. From this, the DIPSTICK value and the 32 samples in the FIFO are subtracted to determine the number of samples ahead of or behind the processor decoder 100 is outputting data with respect to the PTS.

The time advantage and sample advantage values are then used to maintain synchronization by dropping or adding individual samples. Specifically, samples are added when the time advantage is a positive value and dropped when the time advantage is negative. Similarly, samples are added when the sample advantage is positive and dropped when it is negative. This is in contrast to most existing systems, where entire frames of data are added or dropped.

The time advantage and sample advantage equations set forth above are applicable once decompressed audio (PCM) samples including the referenced sample are available after the decompression process. (The referenced sample associated with the presentation time stamp is again typically the first sample obtained from the decompression of a "block" of compressed data). However, in certain situations, for example, upon initial acquisition of a channel or after recovering from an error, decisions regarding the "playability" of the audio (PCM) samples must be made, preferably before the decompression process since the synchronization decision may turn out to be to drop the block and samples altogether.

In an alternate embodiment, the time advantage and/or sample advantage equations may be evaluated and decisions made prior to the decompression process. However, in this case, the validity of such decisions made prior to the decompression process must be qualified to be meaningful in predicting the synchronicity of playback. (The decompression process by its very nature is a time-consuming process, thereby rendering moot the evaluation of the time advantage and/or sample advantage equations since these equations are inextricably linked to the "current" time/ status).

It should be noted that as long as the value "DIPSTICK+ FIFO__SIZE", quantified in both the time advantage and sample advantage equations (the units of both "DIPSTICK" and "FIFO__SIZE" being samples), is larger than the number of samples represented by a compressed audio "block", then the time advantage and/or sample advantage evaluations may be deemed "valid" for pre-decompression purposes. Specifically, by its very nature, the decompression process demands that decompression of an audio block occur in a time that is less than or equal to (in practice, significantly less than) the playback time of that number of samples. As time progresses and samples are played out, the time advantage and sample advantage equations evaluate to the same quantity as long as the value "DIPSTICK+FIFO__SIZE" is "large" enough to accommodate the depletion of samples in that duration. It should be noted that the value STC__lhe advances each instant the output FIFO is reloaded and that the value "DIPSTICK+FIFO__SIZE" reduces each time samples are withdrawn to load the output FIFO as the output FIFO is drained continually. The value "DIPSTICK+FIFO__ SIZE" may only be a non-negative quantity.

Thus, as long as the "DIPSTICK+FIFO_SIZE" sum amounts to more samples than the number of samples represented in an as yet undecompressed block of audio, and because it can be reasonably expected that a properly capable decoder decompresses a block of samples in less time than represented by the time required to play back that block of samples, it is reasonable to expect that the output (lefthand side) of the time advantage and sample advantage equations to be "valid" before commencement of a decompression process such that decisions can be based on that expectation.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method synchronizing data streaming in a system including a buffer in memory and a first-in-first-out memory comprising the steps of:
   receiving a reference sample along with a corresponding time stamp, the time stamp indicating a presentation time for the reference sample in system time clock units;
   storing the reference sample in the buffer, the buffer storing previously received samples;
   loading a selected number of samples from the buffer into the first-in-first-out-memory when the first-in-first-out memory empties to a predetermined level; and
   determining a time difference in system time clock units between the presentation time and an output time of the reference sample from the first-in-first-out memory comprising the substeps of:
      determining a first value representing a difference in system time clock units between the presentation time and a time of executing said step of loading;
      determining a second value representing a delay in system time clock units required to transfer the reference sample through the buffer to an output of the first-in-first-out memory; and
      taking the difference in system clock units between the first and second values.

2. The method of claim 1 wherein data is output from the first-in-first-out memory at a sampling frequency and said step of determining the second value comprises the substep of multiplying a number of samples in the memory buffer and the first-in-first-out memory between the reference sample and the output by a ratio of a frequency of the system time clock and the sampling frequency.

3. The method of claim 1 wherein said step of loading is performed when the first-in-first-out memory is half empty.

4. The method of claim 1 wherein the streaming data comprises a packetized elementary stream of data.

5. The method of claim 4 wherein the packetized stream comprises audio data.

6. The method of claim 1 and further comprising the step of adding samples to a stream of samples output from the first-in-first-out memory when the time difference between the presentation time and the output time of the reference sample is a positive value and dropping samples when the time difference between presentation time and the time of output of the reference sample is a negative value.

7. The method of claim 1 and further comprising the step of determining a time difference prior to step of decompressing said prior data.

8. A method synchronizing data streaming in a system including a buffer in memory and a first-in-first-out memory comprising the steps of:
   receiving a reference sample along with a corresponding time stamp, the time stamp indicating a presentation time for the reference sample in system time clock units;
   storing the reference sample in the buffer, the buffer storing previously received samples;
   loading a selected number of samples from the buffer into the first-in-first-out memory when the first-in-first-out memory empties to a predetermined level; and
   determining a difference in number of samples being output between the presentation time and the output time of the reference sample from the first-in-first-out memory comprising the substeps of:
      determining a first value representing a difference in the number of samples between the current sample being output and the reference sample at the time of performing said step of loading;
      subtracting a number of previously stored samples in the buffer and first-in-first-out memory from the first value.

9. The method of claim 8 wherein samples are output from the first-in-first-out memory at a sampling rate and said step of determining the first value comprises the substeps of:
   determining a difference in number of time clock units between the presentation time and the time of performing said step of loading; and
   multiplying the difference in number of time clock units by a ratio of the sampling frequency and a frequency of the system time clock.

10. The method of claim 8 and further comprising the step of adding samples to a stream of samples output from the first-in-first-out memory when the difference in samples being output between the presentation time and the output time of the reference sample is a positive value and subtracting samples from the stream when the difference in samples is a negative value.

11. The method of claim 8 wherein said step of loading is performed when the first-in-first-out memory is half empty.

12. The method of claim 8 wherein the streaming data comprises a packetized elementary stream of data.

13. The method of claim 9 wherein the packetized stream comprises audio data.

14. The method of claim 8 and further comprising the step of determining a difference in number of samples prior to step of decompressing said prior data.

15. An audio decoder comprising:
   an input port for receiving a packetized elementary stream of audio data, presentation time stamps periodically inserted in said stream;
   a data buffer for storing audio samples retrieved from said stream;
   an output first-in-first-out memory for sourcing decoded audio data to an external device at a selected sampling rate, said output first-in-first-out memory loaded from the data buffer when said first-in-first-out memory reaches a partially empty level; and a digital signal processor for determining a time advantage between a time indicated by a said presentation time stamp for output of a reference sample from the first-in-first-out memory and an actual time of output of said reference sample in accordance with the formula:

$$TA = PTS - STC\_lhe - \{(DIPSTICK + FIFO\_SIZE) * (STCfreq/Fs)\}$$

wherein:

TA is the time advantage in system time clock units;

PTS is the presentation time stamp in units of the system time clock;

STC_lhe is the time of reload of the first-in-first-out memory;

DIPSTICK is the number of samples in the buffer at time of reload;

Fs is the frequency at which samples are output from the first-in-first-out memory;

STCfreq is the frequency of the system time clock; and

FIFO_SIZE is the number of samples in the first-in-first out memory.

16. The audio decoder of claim 15 wherein said digital signal processor comprises a selected one of a plurality of digital signal processors fabricated on a single chip.

17. The audio decoder of claim 15 wherein the buffer, first-in-first-out memory and digital signal processor are fabricated on a single chip.

18. The audio decoder of claim 15 wherein said audio stream comprises a stream of compressed audio data and said digital signal processor is operable to decompress said data stream prior to storage of said samples in said buffer.

19. The audio decoder of claim 15 wherein said system time clock is derived from a local oscillator and said decoder further comprises circuitry for varying an output frequency of said oscillator in response to a received program clock reference.

20. An audio decoder comprising:

an input port for receiving a packetized elementary stream of audio data, presentation time stamps periodically inserted in said stream;

a data buffer for storing audio samples retrieved from said stream;

an output first-in-first-out memory for sourcing decoded audio data to an external device at a selected sampling rate, said output first-in-first-out memory loaded from the data buffer when said first-in-first-out memory reaches a partially empty level; and a digital signal processor for determining a sample advantage representing a difference in a number of samples being output between a presentation time indicated by a said presentation time stamp for output of a reference sample and an actual output time of the reference sample from the first-in-first-out memory in accordance with the formula:

$$SA = \{(PTS - STC\_lhe) * (F_s/STCfreq)\} - (DIPSTICK + FIFO\_SIZE)$$

wherein:

TA is the time advantage in system time clock units;

PTS is the presentation time stamp in units of the system time clock;

STC_lhe is the time of reload of the first-in-first-out memory;

DIPSTICK is the number of samples in the buffer at time of reload;

$F_2$ is the frequency at which samples are output from the first-in-first-out memory;

STCfreq is the frequency of the system time clock; and

FIFO_SIZE is the number of samples in the first-in-first-out memory.

21. The audio decoder of claim 20 wherein said digital signal processor comprises a selected one of a plurality of digital signal processors fabricated on a single chip.

22. The audio decoder of claim 20 wherein the buffer, first-in-first-out memory and digital signal processor are fabricated on a single chip.

23. The audio decoder of claim 20 wherein said audio stream comprises a stream of compressed audio data and said digital signal processor is operable to decompress said data stream prior to storage of said samples in said buffer.

24. The audio decoder of claim 20 wherein said system time clock is derived from a local oscillator and said decoder further comprises circuitry for varying an output frequency of said oscillator in response to a received program clock reference.

25. A method for synchronizing stream processing with a locally generated system time clock comprising the steps of:

recovering a program clock reference from a transport layer;

varying the frequency of the locally generated system time clock using the program clock reference;

recovering a presentation time stamp from a packetized elementary stream derived from the transport layer;

determining the relationship between a reference sample associated with the presentation time stamp from the packetized elementary stream and a current sample being streamed relative to the system time clock, comprising the substeps of:

storing the reference sample in a buffer holding previously received samples;

loading a selected number of samples from the buffer into a first-in-first-out-memory when the first-in-first-out memory empties to a predetermined level; and determining a time difference in units of the system time clock between the presentation time and an output time of the reference sample from the first-in-first-out memory comprising the substeps of:

determining a first value representing a difference in system time clock units between a time indicated by the presentation time stamp and a time of executing said step of loading;

determining a second value representing a delay in system time clock units required to transfer the reference sample through the buffer to an output of the first-in-first-out memory; and taking the difference in system clock units between the first and second values; and adding and subtracting data samples from a stream of data samples being output in response to said step of determining to establish a relationship between the presentation time stamp and the stream of samples relative to the system time clock.

26. A method for synchronizing stream processing with a locally generated system time clock comprising the steps of:

recovering a program clock reference from a transport layer;

varying the frequency of the locally generated system time clock using the program clock reference;

recovering a presentation time stamp from a packetized elementary stream derived from the transport layer;

determining the relationship between a reference sample associated with the presentation time stamp from the packetized elementary stream and a current sample being streamed relative to the system time clock, comprising the substeps of:
  loading a selected number of samples from a buffer into a first-in-first-out-memory when the first-in-first-out memory empties to a predetermined level; and
  determining a difference in number of samples being output between the presentation time and the output time of the reference sample from the first-in-first-out memory comprising the substeps of:
    determining a first value representing a difference in a number of samples between the current sample being output from the first-in-first-out memory and the reference sample at the time of performing said step of loading; and
    subtracting a number of previously stored samples in the buffer and first-in-first-out memory from the first value; and
  adding and subtracting data samples from a stream of data samples being output in response to said step of determining to establish a relationship between the presentation time stamp and the stream of samples relative to the system time clock.

* * * * *